(12) United States Patent
Li et al.

(10) Patent No.: US 10,751,808 B2
(45) Date of Patent: Aug. 25, 2020

(54) POSITIONING ASSEMBLY AND METHOD

(71) Applicant: PRATT & WHITNEY CANADA CORP., Longueuil (CA)

(72) Inventors: Yuwen Li, Montreal (CA); Amr Elfizy, Saint-Basile-le Grand (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 24 days.

(21) Appl. No.: 15/414,795

(22) Filed: Jan. 25, 2017

(65) Prior Publication Data

US 2017/0129021 A1 May 11, 2017

Related U.S. Application Data

(62) Division of application No. 14/228,589, filed on Mar. 28, 2014, now Pat. No. 9,597,759.

(51) Int. Cl.
*B23B 31/32* (2006.01)
*B23Q 3/18* (2006.01)

(52) U.S. Cl.
CPC .............. *B23B 31/32* (2013.01); *B23Q 3/183* (2013.01); *B23B 2215/76* (2013.01); *B23B 2260/032* (2013.01); *Y10T 29/49998* (2015.01); *Y10T 279/1016* (2015.01)

(58) Field of Classification Search
CPC ......... B23Q 3/183; B23B 31/32; B23B 31/42; B23B 31/1071; B23B 31/1207; B23B 31/204; B23B 31/261; B24B 45/00; B24B 45/006; F16B 19/00

USPC .............. 279/4.05, 2.03, 2.05; 29/244, 271; 269/310, 291
See application file for complete search history.

(56) References Cited

U.S. PATENT DOCUMENTS

| | | | |
|---|---|---|---|
| 2,026,639 A | | 1/1936 | Klay et al. |
| 2,340,423 A | * | 2/1944 | O'Shaughnessy, Jr. ..................... F16B 19/1081 411/80.2 |
| 2,515,183 A | * | 7/1950 | Benjamin ............. B23B 31/204 279/4.09 |
| 3,025,931 A | * | 3/1962 | Jones ........................ G05G 5/26 188/67 |
| 4,125,883 A | * | 11/1978 | Rolph ................. G11B 17/0286 360/99.05 |
| 4,656,978 A | * | 4/1987 | Deuring .................... F01L 1/25 123/90.55 |
| 4,662,043 A | | 5/1987 | Stone et al. |
| 5,048,005 A | * | 9/1991 | Ekhoff ............... G11B 17/0282 360/99.04 |

(Continued)

*Primary Examiner* — Lee D Wilson
*Assistant Examiner* — Seahee Yoon
(74) *Attorney, Agent, or Firm* — Norton Rose Fulbright Canada LLP

(57) ABSTRACT

A method for positioning a rotary part on a machining fixture adapted to hold the rotary part for a machining operation is described. The machining fixture has a center axis and a diaphragm with engaging segments affixed thereto and extending away therefrom. The method includes mounting the rotary part on the machining fixture concentrically about the center axis and adjacent to the engaging segments, and then applying an axial force in a direction substantially parallel to the center axis against the diaphragm. This elastically deforms the diaphragm and radially displaces the contact members of the engaging segments into frictional engagement with a circumferential surface of the rotary part.

8 Claims, 5 Drawing Sheets

(56) References Cited

U.S. PATENT DOCUMENTS

| | | | |
|---|---|---|---|
| 5,261,772 A * | 11/1993 | Henninger | B62D 27/06 411/15 |
| 5,374,135 A | 12/1994 | Folsom et al. | |
| 5,951,198 A | 9/1999 | Philipps | |
| 5,984,319 A | 11/1999 | Collonia | |
| 7,169,360 B2 * | 1/2007 | Agren | B01L 9/527 360/99.08 |
| 7,192,338 B2 * | 3/2007 | Kausch | B24B 45/00 451/358 |
| 7,765,658 B2 | 8/2010 | Piccioni | |
| 7,770,499 B2 | 8/2010 | Biertz et al. | |
| 2005/0075059 A1 * | 4/2005 | Kausch | B24B 45/00 451/359 |
| 2009/0183349 A1 | 7/2009 | Walsh et al. | |
| 2014/0004779 A1 * | 1/2014 | Namiki | B24B 37/32 451/365 |
| 2015/0217632 A1 | 8/2015 | Lebeau et al. | |

\* cited by examiner

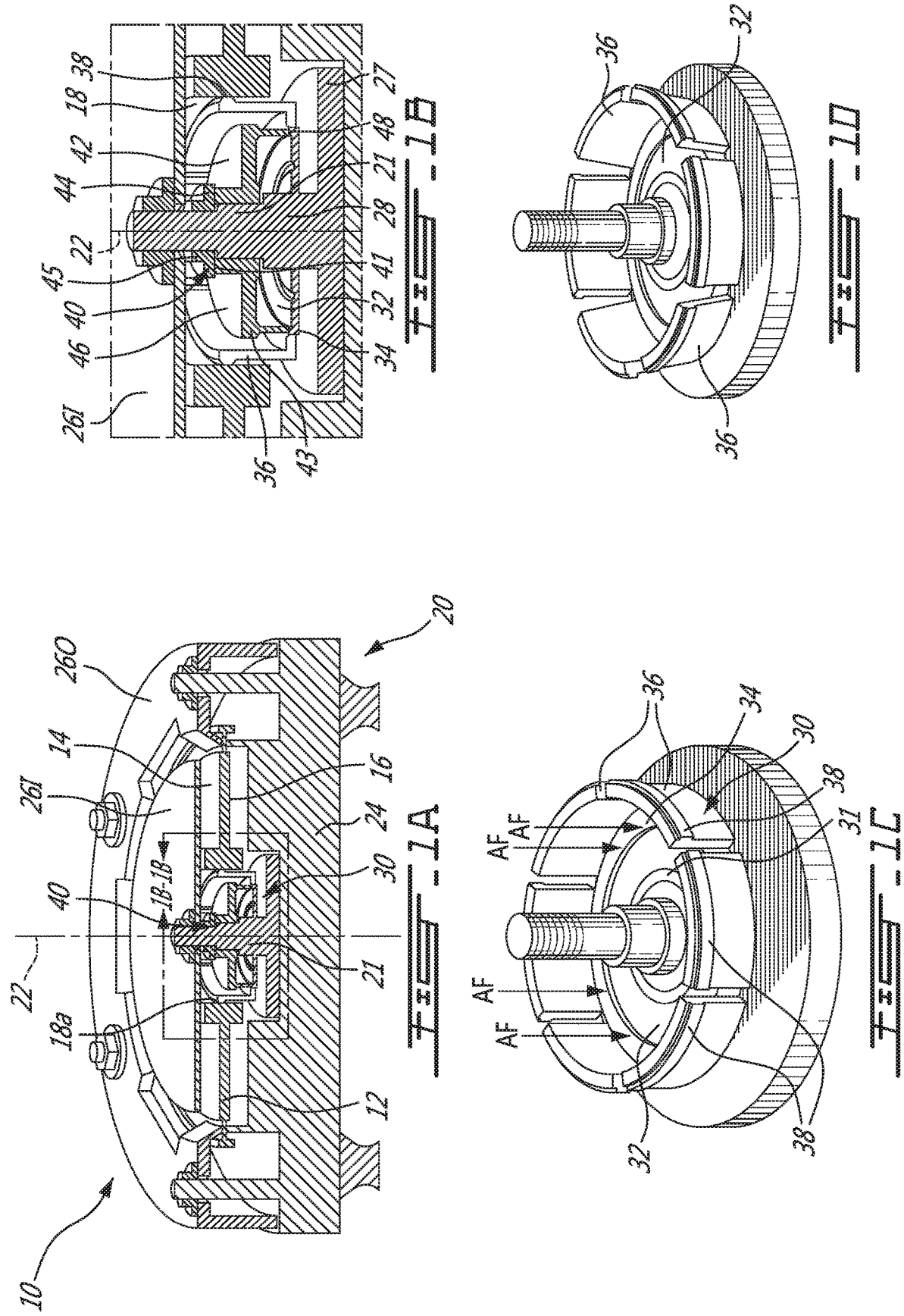

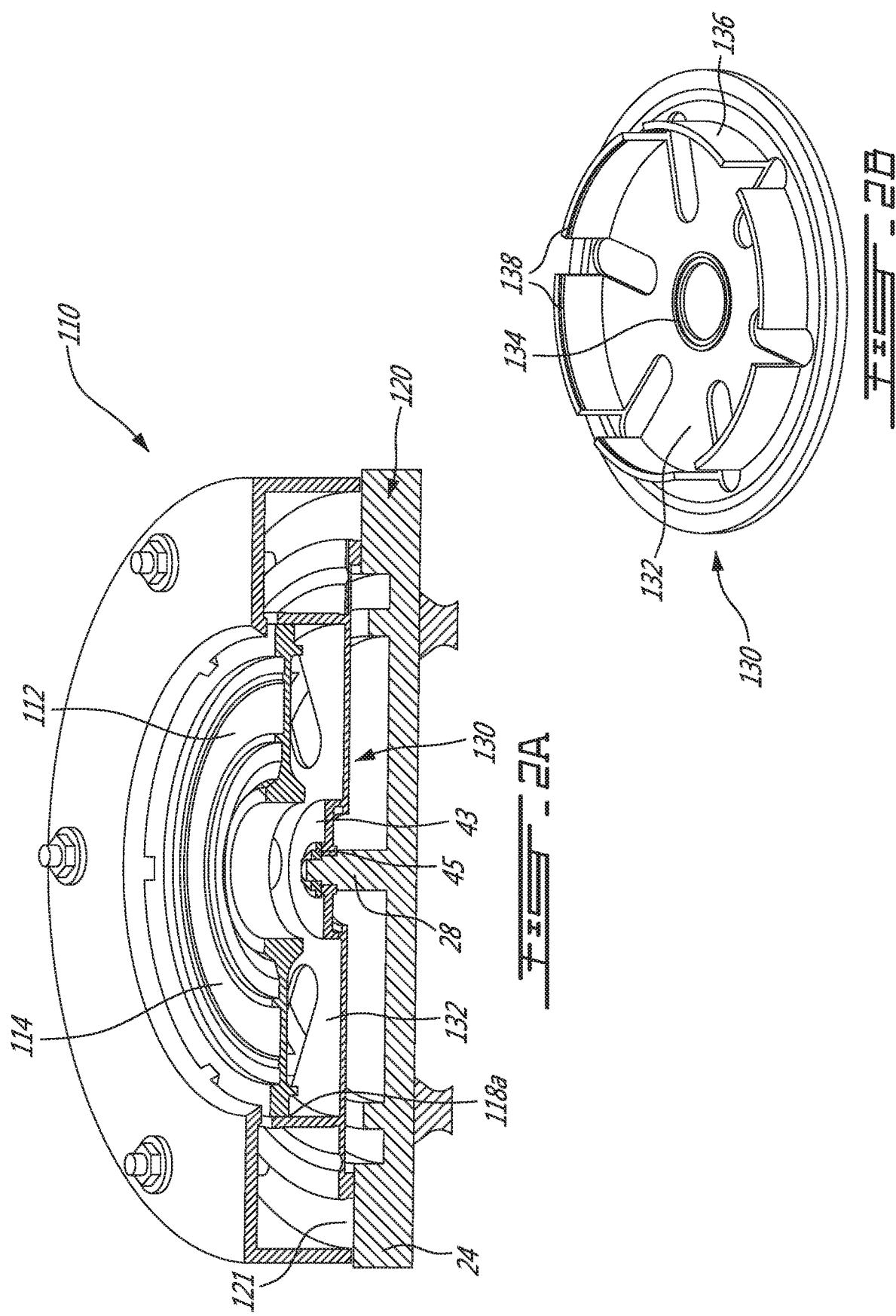

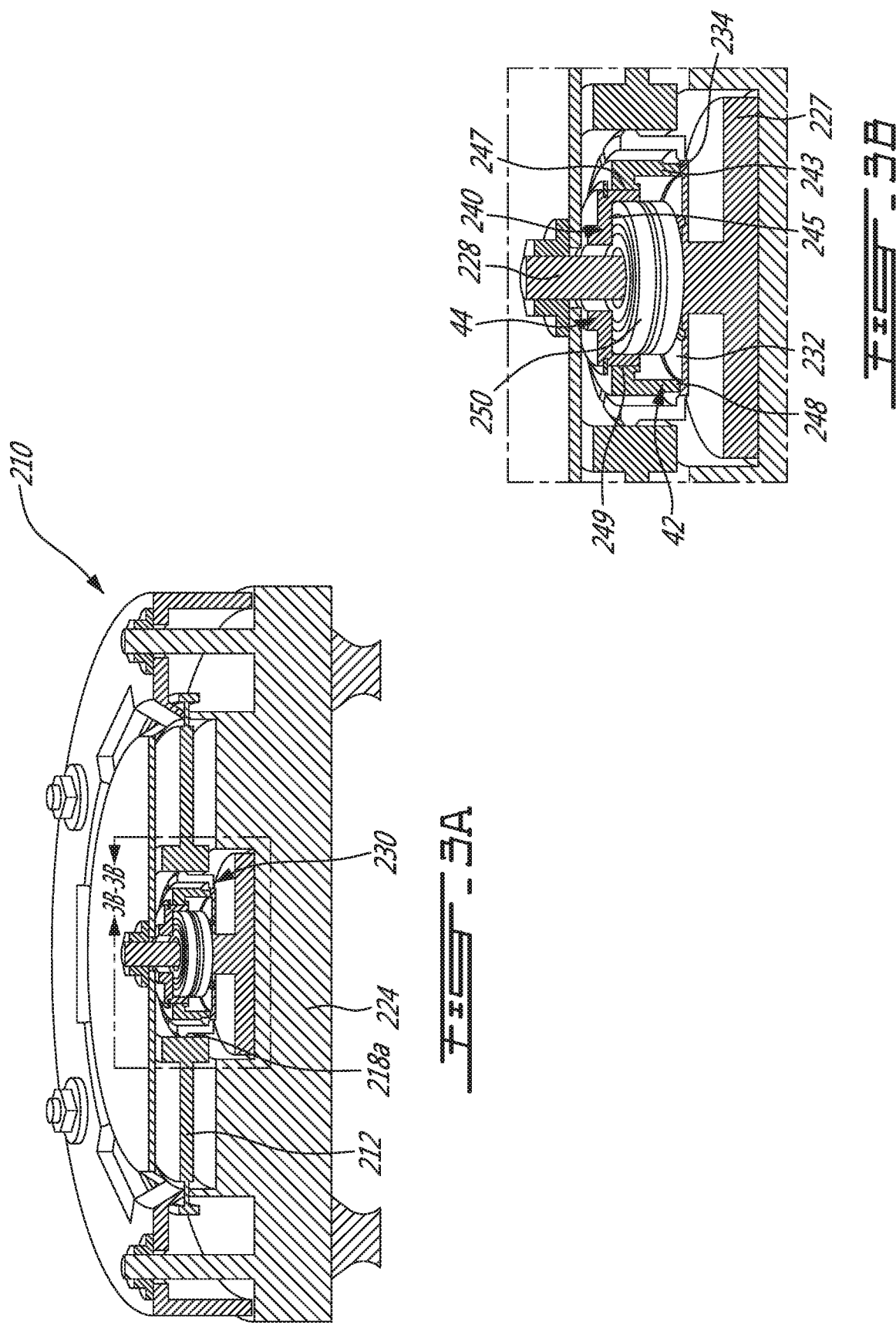

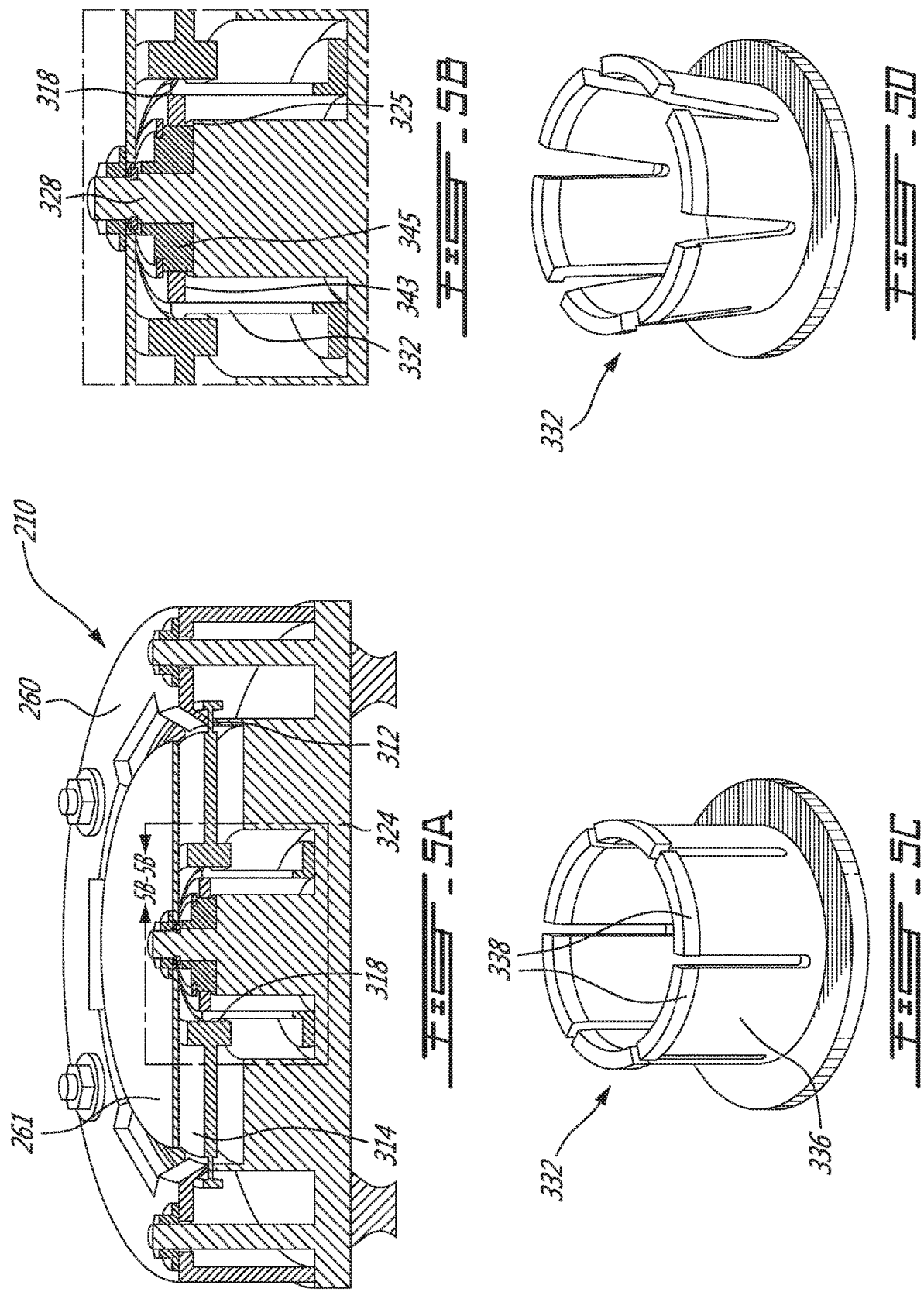

POSITIONING ASSEMBLY AND METHOD

CROSS-REFERENCE TO RELATED APPLICATIONS

The present application is a divisional of U.S. patent application Ser. No. 14/228,589 filed Mar. 28, 2014, the entire content of which is incorporated herein by reference.

TECHNICAL FIELD

The present disclosure relates generally to positioning workpieces for machining, and more particularly, to a positioning assembly and method for positioning a rotary part.

BACKGROUND OF THE ART

Prior to their machining or manufacturing, rotary parts such as those used in gas turbine engines must be precisely loaded and positioned in the machining tool. In many cases, the rotary parts are pre-assembled with supporting fixtures before being machined in order to reduce the occurrence of deformations and vibrations when the rotary part is being machined.

Current techniques for positioning the rotary part in the machining tool typically involve setting up the rotary part and the supporting fixtures by hand. This manual setup can be tedious and time-consuming, and can lead to a considerable loss of machining time. Such a manual set-up may also increase the risk of damage to the rotary part. Furthermore, conventional techniques often act as a bottleneck in the machining process because of the significant human intervention required.

SUMMARY

In one aspect, there is provided a positioning assembly for positioning a rotary part having at least a first surface to be machined, comprising: a machining fixture having a positioning support member defining a center axis, the rotary part concentrically mountable to the machining fixture about the center axis to expose the first surface; a positioning device having an elastically-deformable diaphragm, concentrically mounted to the machining fixture about the positioning support member and defining an annular loading zone thereon, and a plurality of circumferentially-spaced engaging segments fixed to the diaphragm and extending away therefrom, at least some of said engaging segments having a contact member which is displace radially to frictionally engage a circumferential surface of the rotary part when the annular loading zone receives an axial force applied thereon substantially parallel with the center axis; and an actuating member having a force applicator displaceable relative to the machining fixture about the center axis, the actuating member having a proximal surface and a distal surface for engaging the loading zone of the diaphragm, and a force provider having an application surface engaging with the proximal surface of the force applicator to provide the axial force thereto.

In another aspect, there is provided a method for positioning a rotary part on a machining fixture adapted to hold the rotary part for a machining operation, the machining fixture having a center axis and a diaphragm with engaging segments affixed thereto and extending away therefrom, the method comprising: mounting the rotary part on the machining fixture concentrically about the center axis and adjacent to the engaging segments; and applying an axial force in a direction substantially parallel to the center axis against the diaphragm to elastically deforming the diaphragm and radially displace contact members of the engaging segments into frictional engagement with a circumferential surface of the rotary part.

DESCRIPTION OF THE DRAWINGS

Reference is now made to the accompanying figures in which:

FIG. 1A is a perspective cross-sectional view of a positioning assembly for a rotary part showing a machining fixture, a positioning device, and an actuating member, according to an embodiment;

FIG. 1B is a detailed perspective cross-sectional view of the positioning device and the actuating member of the positioning assembly of FIG. 1A, taken from region 1B of FIG. 1A;

FIG. 1C is a perspective view of the positioning device of FIG. 1A;

FIG. 1D is a perspective view of the positioning device of FIG. 1A, shown under radial expansion;

FIG. 2A is a perspective cross-sectional view of a positioning assembly for a rotary part showing a machining fixture, a positioning device, and an actuating member, according to another embodiment;

FIG. 2B is a perspective view of the positioning device of FIG. 2A;

FIG. 3A is a perspective cross-sectional view of a positioning assembly for a rotary part showing a machining fixture, a positioning device, and an actuating member, according to yet another embodiment;

FIG. 3B is a detailed cross-sectional view of the positioning device and the actuating member of the positioning assembly of FIG. 3A;

FIG. 5A is a perspective cross-sectional view of a positioning assembly for a rotary part showing a machining fixture, a positioning device, and an actuating member, according to yet another embodiment;

FIG. 5B is a detailed cross-sectional view of the positioning device and the actuating member of the positioning assembly of FIG. 5A;

FIG. 5C is a perspective view of the positioning device of FIG. 5A; and

FIG. 5D is a perspective view of the positioning device of FIG. 5A being shown under radial expansion.

DETAILED DESCRIPTION

Figure 4A:
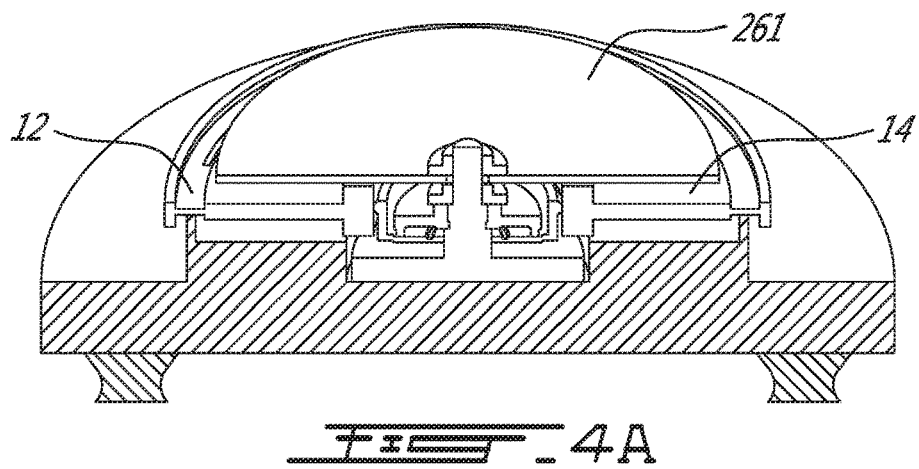
FIG. 4A is a perspective cross-sectional view of the positioning assembly of FIG. 1A, shown having an inner cover.

Referring to FIG. 1A, the positioning assembly 10 (or simply "assembly 10") is used to position a rotary part 12 with relative ease so that it can be cut, milled, drilled, formed or otherwise machined as desired. Many types of machining operations and tools can be used with the assembly 10, such as lathes. The positioning of the rotary part 12 can take many forms. For example, the assembly 10 can be used to position the rotary part 12 so that its center is aligned with a central axis, such as the axis of the spindle of the machining tool being used. Such an operation is referred to as "centering". Alternatively, the assembly 10 can be used to position the rotary part 12 so that another portion or feature of the rotary part 12 is aligned with the axis of the machining tool being used.

The rotary part 12 (or simply "part 12") being positioned by the assembly 10 can be any workpiece or object which will rotate about an axis when in operation. Some non-limiting examples of parts 12 that can be positioned with the assembly 10 include turbine rotors, compressor rotors, fans, disks, integrally bladed rotors (IBRs), and other disk-shaped workpieces used in gas turbine engines. The part 12 being machined will typically have a first surface 14, an opposed second surface 16 and an outer radial edge. The part 12 can be flipped so that either of the first and second surfaces 14,16 can be machined as desired.

As seen in FIG. 1A, the assembly 10 has a machining fixture 20 which receives the part 12 to be machined, a positioning device 30 which positions the part 12 within the machining fixture 20, and an actuating member 40 which applies an axial force to help position the part 12.

The machining fixture 20 (or simply "fixture 20") serves as an interface between the part 12 to be machined, and the machining tool itself. In securing the part 12, the fixture 20 helps to reduce deformations caused to the part 12 and the vibrations it experiences as a result of the machining operation. To achieve such functionality, the fixture 20 can take many different forms depending on the part 12 to be machined and the machining tool being used, to name but a few possible factors. It will therefore be appreciated that the configuration of the fixture 20 is not limited to the exemplary configurations shown in the figures.

The fixture 20 is generally, but not exclusively, a circumferential fixture 20. It has a positioning support member 21, which defines a center axis 22 extending through the center of the fixture 20. The part 12 is concentrically mountable to the fixture 20 so that some or all of the first surface 14 is exposed and can be machined. The expression "concentrically mountable" refers to the part 12 being mounted to, and removable from, a surface of the fixture 20 such that the center of the part 12 is aligned with the center axis 22. The positioning support member 21 can be any portion or section of the fixture 20 which helps to support the positioning device 30. For example, in the embodiment shown in FIG. 2A, the positioning support member 121 is a circumferential surface which supports the outer periphery of the positioning device 130.

In other embodiments, such as the one shown in FIGS. 1A and 1B, the positioning support member 21 can be a centrally located mounting post or shaft 28, which extends generally perpendicularly away from a base plate 24. The base plate 24 receives the part 12 (generally the surface 14,16 not being machined) and provides the corpus of the fixture 20. A zero-point clamping interface can be affixed to the base plate 24 so that it can interfaced with the machining tool. The mounting shaft 28 is concentric about the center axis 22. The mounting shaft 28 can help to position the part 12 and the positioning device 30, and particularly to center these components, on the fixture 20, as will be described in more detail below. The mounting shaft 28 can be threaded along some or all of its length, and can have a varying thread along its length. For example, the thread of the mounting shaft 28 intended to cooperate with cover clamping nuts can be different from the thread of the mounting shaft 28 intended to cooperate with a centering nut. The mounting shaft 28 can also have a groove, a stopping member (such as a radially protruding lip or flange) on its outer periphery, or a stepped configuration defined by varying its diameter at intervals along its length. These configurations can be used to help arrest the axial displacement of the force applicator described below.

The fixture 20 can also have one or more covers 26 which help to secure the part 12 to the fixture 20 by clamping or otherwise mechanically fixing it into place. FIG. 1A provides an example of a cover 26 configuration, where an inner cover 26I is secured to the fixture via cover clamping nuts attached to the threaded mounting shaft 28. The inner cover 26I extends over an inner portion of the first surface 14 of the part 12 and shields it from the machining tool and the debris produced by its operation. FIG. 1A also shows an outer cover 26O, which can also be secured to the fixture via cover clamping nuts attached to outer corresponding bolts. The outer cover 26O extends over an outer portion of the first surface 14 of the part 12 and also shields it from the machining tool and the debris produced by its operation. The space between the inner cover 26I and the outer cover 26O provides the access required of the machining tool to machine the desired portion of the first surface 14 of the part 12.

The assembly 10 also has a positioning device 30 which interfaces between the part 12 and the fixture 20 so as to position the part 12 within the fixture 20. Generally, the positioning device 30 is present on the fixture 20 before the part 12 is installed thereon and cooperates with the positioning support member 21. The positioning device 30 can be integral with, or separate from, the fixture 20 or the positioning support member 21.

Referring to FIGS. 1B to 1D, the positioning device 30 has an elastically-deformable diaphragm 32 at its base and a plurality of upstanding engagement segments 36 which extend from the outer periphery of the diaphragm. The diaphragm 32 elastically deflects when an axial force AF is applied thereon, such that the plurality of engaging segments 36 having contact members 38 are radially displaced so as to engage a circumferential surface 18 of the part 12.

The diaphragm 32 is elastically-deformable, meaning that its shape will change in response to the axial force AF, and will revert back to its original shape when the axial force AF is no longer being applied. The diaphragm 32 is typically made of a suitable metal, and can achieve its elastic properties either through its material composition, or material thickness. For example, the diaphragm 32 can be a relatively thin circumferential plate which responds elastically to the application of a perpendicular force. Since the diaphragm 32 is substantially circumferential in shape, its elastic deformation will cause the engaging segments 36 to extend away from the diaphragm 32 to experience radially inward or outward bending. As such, the diaphragm 32 can be referred to as a "flexure" structure.

The diaphragm 32 is concentrically mountable to the fixture 20 about its positioning support member 21, which means that the diaphragm 32 can be affixed to, or removed from, the fixture 20. As previously explained, "concentrically" means that the diaphragm 32 shares a common center point with the positioning support member 21 (i.e. at the location of the center axis 22). The mounting of the diaphragm 32 to the fixture 20 can take different forms. For example, the diaphragm 32 can be integral and concentric with a feature of the fixture 20, such as the mounting shaft 28. In another possible embodiment, and as shown in FIG. 1O, the diaphragm 32 can be integral or "one-piece" with the mounting shaft 28 and with a separate support 27, and the entire integral structure can be inserted into a depression of the base plate 24. In yet another embodiment, and as shown in FIGS. 2A and 2B, the diaphragm 132 can be a separate component from the fixture 120 and mounted onto the positioning support member 121 prior to the fixture 120 receiving the part 12. It can thus be appreciated that many different configurations for mounting the diaphragm 32 to the fixture 20 are within the scope of the present disclosure.

Returning to FIGS. 1B to 10, the diaphragm 32 includes and defines a loading zone 34. The loading zone 34 is an area or region on the surface of the diaphragm 32 marking the position where a force being parallel to the center axis 22 (i.e. the axial force AF) is applied to a surface of the diaphragm 32. In most embodiments, the loading zone 34 is annular which helps distribute the axial force AF uniformly on the diaphragm 32 and may allow for a more uniform radial displacement of the contact members 38. However, other suitable shapes for the loading zone 34 are within the scope of the present disclosure. Optionally, the loading zone 34 can form a circumferential projection extending away from the surface of the diaphragm 32. Such a configuration of the loading zone 34 may be desirable depending on the actuating member 40 being used to apply the axial force AF, and the desired deformation of the diaphragm 32, to name but a few possible factors.

The multiple engaging segments 36 of the positioning device 30 are fixed to the diaphragm 32, such that flexure of the diaphragm in response to the axial force AF causes a corresponding flexure of the engaging segments 36. The engaging segments 36 extend away from the surface of the diaphragm 32 and are generally oriented perpendicularly to this surface. The engaging segments 36 can form a "slotted wall" because they are spaced apart from one another along a circumference of the diaphragm 32. The slots between the engaging segments 36 can extend along the entire length of adjacent engaging segments 36 so as to form discrete engaging segments 36 extending from the surface of the diaphragm 32. Alternatively, the slots can extend along only some of the length of adjacent engaging segments 36 so as to link the engaging segments 36 to the diaphragm 32 and each other.

At least one, but generally all, of the engaging segments 36 has a contact member 38. The contact members 38 are displaced radially inward (i.e. toward to the center axis 22) or radially outward (i.e. away from the center axis 22) so as to enter into contact with a circumferential surface 18 of the part 12. The circumferential surface 18 can be any rounded surface of the part 12 which can be used to position or center the part 12 on the fixture 20. In contacting the part 12, the contact members 38 help to position the part 12 on the fixture 20 and secure it in place. The contact members 38 can take many forms. For example, the contact members 38 can be a textured region or surface of the engaging segment 36 which enters into contact with the part 12. In most embodiments, the contact members 38 are protrusions or projections extending away from an inner or outer surface of the engaging segment 36 on which it is located. The depth or height of the engaging segments 36 can be selected so that the radial displacement of the contact members 38 is sufficient to accommodate the dimension tolerance zone of the part 12.

Each of the contact members 38 are displaced radially by the application of the axial force AF on the diaphragm 32. The radial displacement generally results from an outward or inward bending on the engaging segment 36 on which the contact member 38 is disposed because of the engaging segment's 36 fixed attachment to the elastically deformable diaphragm 32. Once sufficiently radially displaced, each contact member 38 contacts the circumferential surface 18 so as to frictionally engage the part 12. This frictional engagement of the contact members 38 with the circumferential surface 18 helps to prevent or reduce relative movement between these two components, thus better securing the part 12 to the fixture 20.

Still referring to FIG. 1B, the assembly 10 also has an actuating member 40. The actuating member 40 provides the axial force AF described above so as to elastically deform the diaphragm 32. The actuating member 40 can be any device providing the necessary motion to achieve such functionality. For example, the actuating member 40 can be driven by hand, or can alternatively be a mechanical, pneumatic, electrical, or hydraulic device. Similarly, the operation of the actuating member 40 can be automated if desired. The actuating member 40 has a force applicator 42 which engages with the diaphragm 32 to elastically deform it, and a force provider 44 which engages with the force applicator 42 and provides the axial force AF thereto.

The force applicator 42 is displaced relative to the fixture 20 and concentrically about the center axis 22. It has a proximal surface 46 which faces away from the diaphragm 32, and a distal surface 48 which engages the diaphragm 32, generally at the loading zone 34, when the axial force AF is applied by the force provider 44. The force provider 44 has an application surface 41 which in operation engages with the proximal surface 46 of the force applicator 42 to provide the axial force AF thereto. Although described herein separately, it will be appreciated that the force applicator 42 and the force provider 44 can also be a single device or tool, or different components of a single tool.

The configuration and shape of both the force applicator 42 and the force provider 44 can vary. In the embodiments shown in FIGS. 1A, 1B, and 2A, the force applicator 42 can be a pusher device 43 which can be concentric about the center axis 22, and which can be displaced along the threaded mounting shaft 28. In such a configuration, the force provider 44 can be a centering nut 45 which is itself also displaceable about the mounting shaft 28. The application surface 41 of such a centering nut 45 can be disposed on a distal flange which engages with the proximal surface 46 of the pusher device 43 so as to provide the axial force AF to the pusher device 43. The use of a centering nut 45 further allows for the application of torque by the centering nut 45 to be controlled. The centering nut 45 can be turned about the threaded mounting shaft 28 either manually or using an automatic tool.

In the embodiment shown in FIGS. 3A and 3B, the force applicator 42 can be a pusher device 243 which has a threaded internal surface 247. The force provider 44 can be a lead screw 245, which can be turned about the threaded mounting shaft 28 either manually or using an automatic tool. The application surface of the lead screw 245 can be a threaded outer periphery 249 which can engage with the threaded internal surface 247 of the pusher device 243. In order to apply the axial force AF, the threaded outer periphery 249 is rotated. This rotation causes the thread internal surface 247 to also rotate, which causes the pusher device 243 to be displaced axially toward the diaphragm 232 such that the distal surface 248 of the pusher device 243 eventually contacts the loading zone 234 and applies the axial force AF thereagainst. A roller bearing 250 can engage with the lead screw 245 to reduce the friction acting against the lead screw 245 as it is rotated about the mounting shaft 228, and to reduce the likelihood of the part 12 become jammed with the fixture 20.

Having described at least some of the components and features of the positioning assembly 10, the operation of the assembly 10 will now be discussed in reference to different optional embodiments of the assembly 10.

FIGS. 1A to 1D show an embodiment of the positioning assembly 10 which can be used to center the part 12 via an inner circumferential surface 18 of the part 12, such as its inner bore 18*a*. An integral or "one-piece" diaphragm 32 and threaded mounting shaft 28 affixed to the separate support 27 can be inserted into a depression of the base plate 24. The part 12 can then be placed onto the base plate 24 such that its first surface 14 is exposed for machining, and such that its inner bore 18*a* is disposed around the engaging segments 36 of the positioning device 30. For such a part 12, the non-deformed diameter of the contact members 38 will be less than the diameter of the inner bore 18*a* so that the part 12 can be properly positioned on the fixture 20 over the positioning device 30.

The actuating member 40 can then be positioned about the mounting shaft 28 on the positioning device 30 such that the distal surface 48 of the pusher device 43 aligns with the loading zone 34 of the diaphragm 32. The centering nut 45 can then be mounted about the threaded mounting shaft 28. As the centering nut 45 is rotated and engages the proximal surface 46 of the pusher device 43, it displaces the pusher device 43 toward the diaphragm 32 and parallel to the center axis 22. This displacement of the pusher device 43 eventually brings the distal surface 48 to bear against the loading zone 34, which causes flexure in the diaphragm 32. This elastic deformation of the diaphragm 32 causes the engaging segments 36 affixed thereto to bend outwardly, as shown in FIG. 1D. The degree of outward bending can be increased further with an optional circumferential groove 31, which thins out the material of the diaphragm 32 at the location of the groove 31 and acts as a hinge. The groove 31 is concentric with the diaphragm 32 and disposed thereon, and can be positioned radially inward of the loading zone 34. As the engaging segments 36 bend outwardly, the contact members 38 disposed at distal ends of the engaging segments 36 are radially displaced outwardly and eventually frictionally engage the inner bore 18*a* of the part 12. The relatively uniform radial displacement of the contact members 38 allows for the part 12 to be centered within the fixture 20 and concentrically about the center axis 22. Once so centered, the part 12 can be clamped to the fixture 20 using one or more covers 26. An interface can then be used to secure the assembly 10 onto a machining tool so that the part 12 can be machined.

FIGS. 2A and 2B show an embodiment of the positioning assembly 110 which can be used to center the part 112 via an outer circumferential surface of the part 112, such as its outer diameter 118*a*. A threaded mounting shaft 28 is attached to the base plate 24, and a separate diaphragm 132 can be placed on the positioning support member 121 concentric to the mounting shaft 28. The part 112 can then be placed onto the base plate 24 such that its first surface 114 is exposed for machining, and such that its outer diameter 118*a* is disposed adjacent to the engaging segments 136 of the positioning device 130. For such a part 112, the non-deformed diameter of the contact members 138 will be greater than the diameter of the outer diameter 118*a* so that the part 112 can be properly positioned on the fixture 120 over the positioning device 130.

The actuating member 40 can then be positioned about the mounting shaft 28 on the positioning device 130 such that the distal surface of the pusher device 43 aligns with the loading zone 134 of the diaphragm 132. The centering nut 45 can then be mounted about the threaded mounting shaft 28. As the centering nut 45 is rotated and engages the proximal surface of the pusher device 43, it displaces the pusher device 43 toward the diaphragm 132 and parallel to the center axis 22. This displacement of the pusher device 43 eventually brings the distal surface 48 to bear against the loading zone 134, which causes flexure in the diaphragm 132. This elastic deformation of the diaphragm 132 causes the engaging segments 136 affixed thereto to bend inwardly (i.e. towards the center axis 22). As the engaging segments 136 bend inwardly, the contact members 138 disposed at distal ends of the engaging segments 136 are radially displaced inwardly and eventually frictionally engage the outer diameter 118*a* of the part 12. The relatively uniform radial displacement of the contact members 138 allows for the part 112 to be centered within the fixture 120 and concentrically about the center axis 22.

FIGS. 3A and 3B show an embodiment of the positioning assembly 210 which can be used to center the part 212 via an inner circumferential surface of the part 212, such as its inner bore 218*a*. An integral or "one-piece" diaphragm 232 and threaded mounting shaft 228 affixed to the separate support 227 can be inserted into a depression of the base plate 224. The part 212 can then be placed onto the base plate 224 such that its first surface 14 is exposed for machining, and such that its inner bore 218*a* is disposed around the engaging segments 36 of the positioning device 230. For such a part 212, the non-deformed diameter of the contact members 38 will be less than the diameter of the inner bore 218*a* so that the part 212 can be properly positioned on the fixture 20 over the positioning device 230.

The actuating member 240 can then be positioned about the mounting shaft 228 on the positioning device 230 such that the distal surface 248 of the pusher device 243 aligns with the loading zone 234 of the diaphragm 232. The lead screw 245 can then be mounted about the threaded mounting shaft 28 so that its threaded outer periphery 249 mates with the threaded internal surface 247 of the pusher device 243. As the lead screw 245 is rotated, the pusher device 243 is displaced toward the diaphragm 232 and parallel to the center axis 22. The roller bearing 250 remains in a fixed position about the mounting shaft 228 as the lead screw 245 rotates thereabout. This displacement of the pusher device 243 eventually brings its distal surface 248 to bear against the loading zone 234, which causes flexure in the diaphragm 232. This elastic deformation of the diaphragm 232 causes the engaging segments 36 affixed thereto to bend outwardly. As the engaging segments 36 bend outwardly, the contact members 38 disposed at distal ends of the engaging segments 36 are radially displaced outwardly and eventually frictionally engage the inner bore 218*a* of the part 212. The relatively uniform radial displacement of the contact members 38 allows for the part 212 to be centered within the fixture and concentrically about the center axis 22.

Figure 4B:
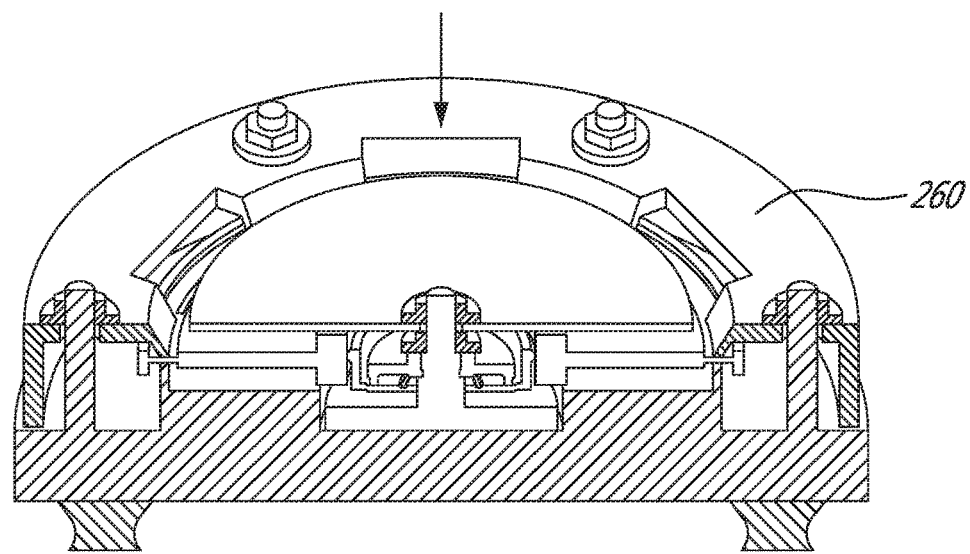
FIG. 4B is a perspective cross-sectional view of the positioning assembly of FIG. 1A, shown having an inner cover and an outer cover.
Figure 4C:
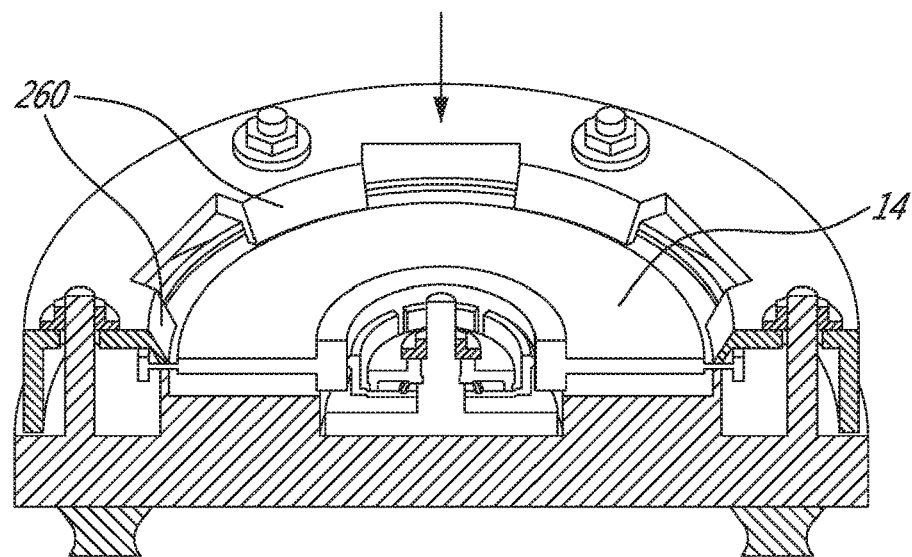
FIG. 4C is a perspective cross-sectional view of the positioning assembly of FIG. 1A, shown having an outer cover.

Once the part 12 is secured in position on the fixture 20, it can be clamped or otherwise secured into place using the covers 26. The covers 26 can then be removed or changed as required. One possible technique for doing so is shown in FIGS. 4A to 4C. As shown in FIG. 4A, the part 12 is assembled with the fixture 20 and clamped first by an inner cover 26I. Once the assembly 10 is loaded into a machining tool such as a CNC machine, the portion of the first surface 14 of the part 12 not protected by the inner cover 26I can be machined. The assembly 10 can then be removed from the machining tool and an outer cover 26O can be assembled, as shown in FIG. 4B. Both the inner and outer covers 26I,26O can have interlocked clamping fingers which clamp onto one of the surfaces of the part 12. In so doing, the part 12 remains fixed in the fixture 20 and it is possible to minimise any internal stress when the outer cover 26O is clamped. Once the outer cover 26O is secured, the inner cover 26I can be removed as shown in FIG. 4C, and the part 12 can then be machined on the portions of the first surface 14 not covered by the outer cover 26O.

FIGS. 5A to 5D show another embodiment of the positioning assembly 310. The positioning device shown is a sleeve flexure 332, which has a slotted cylindrical wall defined by tapered engaging segments 336. The engaging segments 336 are fixed to a base plate of the sleeve flexure 332, and have contact members 338 projecting from distal ends of the engaging segments 336 radially outward. In its non-deformed status, the diameter of the contact members 338 is less than that of the inner circumferential surface 318 (i.e. the inner bore of the part 312) so the part 312 can be placed onto the fixture about the engaging segments 336. The force applicator can be a taper ring 343 which engages an inner circumferential surface of the sleeve flexure 332 so as to apply a radial force outwardly thereagainst. The force provider can be a lead screw 345 which engages the threaded mounting shaft 328 and rotates thereabout.

In use, radial forces are applied on the tapered engaging segments 336 of the sleeve flexure 332 by the lead screw 345 via the taper ring 343. The engaging segments 336 of the sleeve flexure 332 deform radially outwardly, and the contact members 338 expand uniformly until they are in contact with the inner bore of the part 312. The torque to be applied by the lead screw 345 can be controlled as desired, and a circumferential stopping member 325, such as the shoulder as shown in FIG. 5B, can be made on an outer periphery of the mounting shaft 328. Both the control of the applied torque and the circumferential stopping member 325 can help prevent over expansion and damage resulting from distortion of the part 312.

A method for positioning a rotary part on a machining fixture with a diaphragm. The method includes mounting a first surface of the rotary part on the machining fixture concentrically about the center axis.

The method also includes applying an axial force in a direction substantially parallel to the center axis against the diaphragm of the positioning device. This force can be applied with the actuating member described above. As such, applying the axial force can include axially displacing the force applicator against the diaphragm, and arresting or stopping this axial displacement when it is no longer necessary to apply the axial force. Similarly, applying the axial force can include controlling application of the axial force against the diaphragm, such as by controlling the torque applied by the actuating member. The axial force can also be applied against a specific portion of the diaphragm, such as its loading zone.

The method also includes elastically deforming the diaphragm in response to the application of the axial force. Such an elastic deformation allows for repeated use of the positioning device. The method also includes radially displacing, either away from the center axis or toward the center axis, in order to frictionally engage the inner or outer circumferential surface of the part when the axial force is applied against the diaphragm.

The method can also include mounting the machining fixture to a machining tool and aligning the center axis with a spindle of the machining tool so that the part can be machined. This can be preceded by first securing the rotary part to the machining fixture with a cover.

In light of the preceding, it can be appreciated that the assembly 10 and method disclosed herein can help to automatically position or "self-center" the part 12 to be machined by using different reference positions of the part 12. In so doing, the assembly 10 and method help to obtain and maintain the positional accuracy of the part 12 on the fixture 20.

Furthermore, the cooperation of the fixture 20 and the positioning device 30 can help to reduce the time required to flip the part 12 so that both its surfaces 14,16 can be machined. For example, once machining operations have been completed on the first surface 14, the assembly 10 can be removed from the machining tool, the part 12 can be removed, and the first surface 14 can be flipped so that it rests against the base plate 24. The second surface 16 is then ready to be machined, and the part can easily be positioned again on the fixture 20 because the positioning device 30 remains in place on the fixture 20.

This cooperation of the fixture 20 and the positioning device 30 can thus facilitate set-up of the part 12 away from the machining tool, and thus, precise machine loading of the part 12. It can further help to improve the positioning precision of rotary parts 12 relative to the CNC machines or other machining tools used for their manufacturing. Furthermore, this cooperation can minimize the machine time required for part setup and alignment. It can thus be appreciated that the assembly 10 and method lend themselves to being used or performed by a human operator, or within a fully automatic manufacturing cell without human intervention. In removing or minimizing human intervention for fixture 20/part 12 assembly and loading, it may be possible to improve the efficiency of machining operations and reduce the number of rework and scrap parts resulting from human intervention when positioning the rotors in the machining tool.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for positioning a rotary part on a machining fixture adapted to hold the rotary part for a machining operation, the machining fixture having a center axis and a diaphragm with engaging segments affixed thereto and extending away therefrom, the method comprising:
   mounting the rotary part on the machining fixture concentrically about the center axis and adjacent to the engaging segments; and
   applying an axial force in a direction substantially parallel to the center axis against the diaphragm and at a location on the diaphragm spaced apart from the engaging segments to elastically deform the diaphragm and radially displace contact members of the engaging segments into frictional engagement with a circumferential surface of the rotary part.

2. The method as defined in claim 1, wherein radially displacing the contact members includes radially displacing the contact members away from the center axis to frictionally engage an inner circumferential surface of the rotary part.

3. The method as defined in claim 1, wherein radially displacing the contact members includes radially displacing the contact members toward the center axis to frictionally engage an outer circumferential surface of the rotary part.

4. The method as defined in claim 1, wherein applying the axial force includes axially displacing a force applicator against the diaphragm.

5. The method as defined in claim 4, wherein applying the axial force includes arresting axial displacement of the force applicator.

6. The method as defined in claim 1, wherein applying the axial force includes controlling application of the axial force against the diaphragm.

7. The method as defined in claim 1, wherein applying the axial force includes applying the axial force against an annular loading zone of the diaphragm disposed radially inward of the engaging segments.

8. The method as defined in claim 1, further comprising securing the rotary part to the machining fixture with a cover.

\* \* \* \* \*